May 27, 1924.

J. F. DAVIS

FAUCET

Filed May 18, 1923

1,495,403

Inventor:
JOHN F. DAVIS.

Patented May 27, 1924.

1,495,403

UNITED STATES PATENT OFFICE.

JOHN F. DAVIS, OF DECATUR, ILLINOIS.

FAUCET.

Application filed May 18, 1923. Serial No. 639,763.

*To all whom it may concern:*

Be it known that I, JOHN F. DAVIS, a citizen of the United States, and residing at Decatur, State of Illinois, have invented the new and useful Improvement in Faucets, of which the following is a specification.

This invention relates to faucets, such as are used with barrels and casks.

One of the objects of this invention is to provide a faucet which may be quickly opened and quickly closed, and which is constructed so that it may be tightly closed and locked.

Further objects will appear from the detail description taken in connection with the accompanying drawing, in which.

Figure 1:
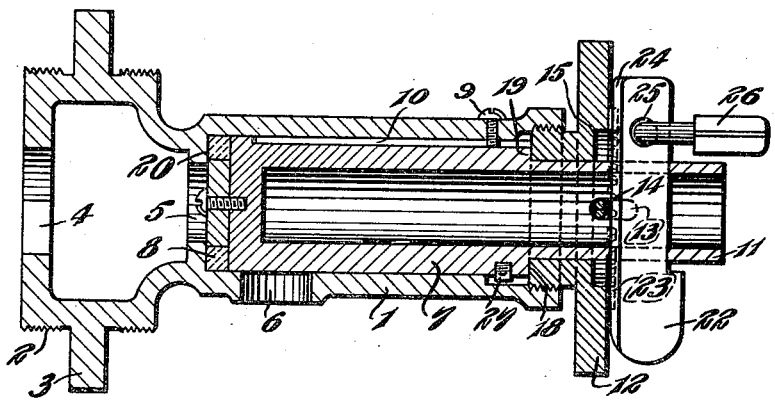
Figure 1 is a longitudinal sectional view showing a faucet embodying this invention.

Referring to the accompanying drawing, 1 designates a casing which may be made of metal or other suitable material and provided with screw threads 2 for screwing into a suitable receptacle in the barrel or cask, and having a flange 3 against which it is screwed up. The casing 1 is provided with an opening 4 communicating with the interior of the cask and ports 5 and 6 through which the liquid may escape when the faucet is opened.

Figure 2:
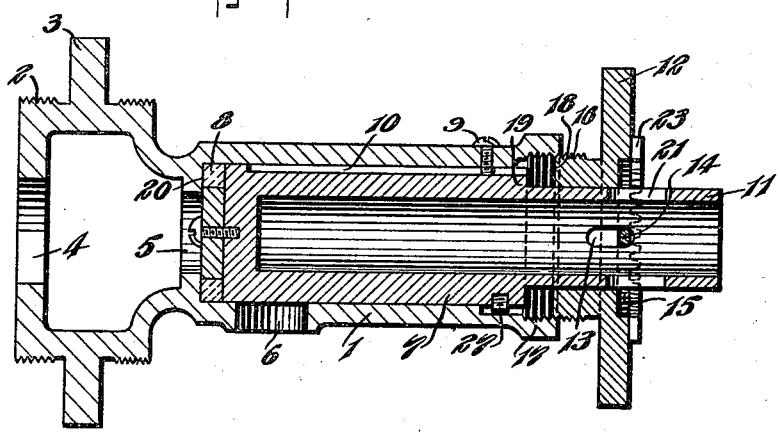
Figure 2 is a view similar to Figure 1, but showing the manipulative element disengaged for quick opening.
Figure 3:
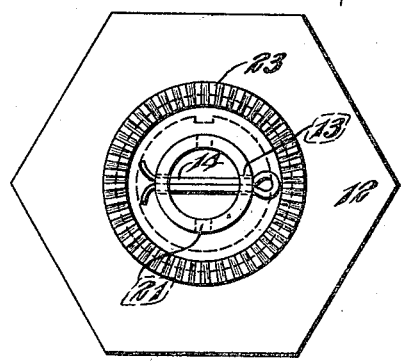
Figure 3 is a right hand end view of Figure 2.

Slidably mounted in the bore of the casing 1 is a valve element 7 equipped at its seating end with a suitable packing washer 8. The valve 7 is slidable lengthwise in the bore of the casing and is engaged by a screw 9 adapted to work in a guide slot 10 in the valve. The valve 7 has a reduced shank 11 at one end thereof upon which a manipulative element 12 is loosely mounted. The shank 11 is pierced with elongated openings 13 through which a cotter-pin 14 may be passed in order to loosely connect the manipulative element 12 with the valve 7. The manipulative element is provided with a circular recess 15 adapted to accommodate the head and tail of the cotter-pin 14 so as to permit rotation of the manipulative element on the shank 11. The manipulative element 12 is provided with screw threads 16 adapted to engage corresponding threads 17 in the casing 1. The inner face 18 of the element 12 is adapted to engage and bear against the shoulder 19 on the casing so that when the manipulative element is screwed up, such engagement will force the valve to the left, Figures 1 and 2, so as to compress the packing 8 firmly against its seat 20 in the casing. The threads 16 and 17 have only a few turns so that the operation of screwing up or loosening the manipulative element so as to connect or disconnect the same from the casing occupies but a moment. During the unscrewing of the element 17, the valve 7 is not unseated and does not open the port 6. Upon completion of the disengagement of the threads 16 and 17, the manipulative element will carry the cotter-pin 14 to the right hand end of the slot 13, as shown in Figure 2, and from this position the valve may be opened by merely drawing back the element 12. This carries the valve 7 to the right so as to uncover the port 6 and permit a flow of liquid. The valve may again be very quickly closed by a mere pressure of the thumb against the end of the shank 11, so as to move the valve 7 to close the port 6. A few turns of the element 12 so as to screw it up on the threads 16 and 17 will force the valve securely against the seat 20 so as to prevent leakage. It will be noted that the lost motion connection between the element 12 and the valve provided by the cotter-pin 14 and the elongated slot 13 allows for completely uncoupling the element 12 from the casing before opening the valve, so that subsequent opening and closing may be very quickly accomplished.

The shank 11 is pierced transversely by a pair of openings 21 adapted to receive a locking element 22. The manipulative element 12 is further provided with a series of teeth 23 arranged in a circle about the recess 15 and the locking element 22 is provided with an edge 24 contoured so as to fit between the teeth 23 when inserted in the openings 21. The teeth 23 thus provide stops so as to prevent rotation of the manipulative element 12 when the locking element 22 is in place. The locking element is provided with a perforation 25 in which an ordinary pad-lock 26 may be inserted to lock the whole against unauthorized manipulation. The screw 9 together with a stop 27 prevent rotation of the valve as a whole in the casing.

It is obvious that various changes may be made in details of construction without departing from the spirit of this invention; it is, therefore, to be understood that this invention is not to be limited to the specific details shown and described.

Having thus described the invention, what is claimed is:

1. A faucet comprising, a casing provided with a port, a valve slidable in said casing to open and close said port, and a manipulative element connected with said valve and adapted to couple with said casing in order to firmly seat said valve.

2. A faucet comprising, a casing provided with a port, a valve slidable in said casing to open and close said port, and a manipulative element connected with said valve and adapted to couple with said casing, said valve being slidable with respect to said element.

3. A faucet comprising, a casing provided with a port, a valve slidable in said casing to open and close said port, and a manipulative element connected with said valve and adapted to couple with said casing in order to seat said valve, said valve being slidable with respect to said element in order to close said port.

4. A faucet comprising, a casing provided with a port, a valve slidable in said casing to open and close said port, a manipulative element on the end of said valve and adapted to couple with said casing in order to bear against said valve to seat the same, said valve being slidable in said element in order to close said port.

5. A faucet comprising, a casing provided with a port, a valve slidable in said casing to open and close said port, a manipulative element on the end of said valve and having a detachable threaded connection with said casing, said valve being slidable in said element to closing position, and said element bearing against said valve in order to seat the same.

6. A faucet comprising, a casing provided with a port, a valve slidable in said casing to open and close said port, a manipulative element on the end of said valve and adapted to couple with said casing, and a lost motion connection between said valve and said element.

7. A faucet comprising, a casing provided with a port, a valve slidable in said casing to open and close said port, a manipulative element on the end of said valve and in which it is slidable, a detachable coupling connection between said element and said casing, and stops on said valve for limiting the movement of said element with respect thereto.

8. A faucet comprising, a casing provided with a port, a valve slidable in said casing to open and close said port, a manipulative element connected with said valve and adapted to couple with said casing, and a locking element between said valve and said manipulative element.

9. A faucet comprising, a casing provided with a port, a valve slidable in said casing to open and close said port, a manipulative element on the end of said valve and having a detachable threaded connection with said casing, said valve being slidable in said element to closing position, and said element bearing against said valve in order to seat the same, and a locking element between said valve and said manipulative element.

In testimony whereof I affix my signature this 3rd day of May, 1923.

JOHN F. DAVIS.